STRAIN RELIEF GROMMET

Filed June 23, 1958

INVENTOR.
George M. Rapata
BY: Olson & Trexler
attys.

3,057,001
STRAIN RELIEF GROMMET
George M. Rapata, Park Ridge, Ill., assignor to Illinois Tool Works, Inc., a corporation of Delaware
Filed June 23, 1958, Ser. No. 743,652
6 Claims. (Cl. 16—2)

The present invention relates to a novel fastening device, and more particularly to a novel strain relief grommet.

Various strain relief grommets have heretofore been proposed for gripping a wire or the like passing through an apertured workpiece in a manner which prevents substantially any tension stresses applied to the wire at one side of the workpiece from being transmitted to a portion of the wire at the opposite side of the workpiece. Certain of the heretofore proposed grommets have been constructed so as to include opposed sections adapted to be snapped through an apertured workpiece and adapted to be collapsed toward each other for gripping a wire or the like therebetween upon insertion into the workpiece aperture. Such opposed portions have usually been provided with shoulder means or the like adapted to engage behind an apertured workpiece for preventing withdrawal of the grommet from the workpiece aperture. The construction of these heretofore proposed grommets has been such that during passage of the shoulder means through a workpiece aperture, the opposed portions of the grommet are urged together and against a wire or the like therebetween by a relatively great force, which force is partially relieved when the shoulder means passes sufficiently through the workpiece for expansion behind the workpiece. As a result, the grip on the wire between the opposed portions of such a heretofore proposed grommet may be relieved sufficiently to permit undesirable transfer of stresses from a portion of the wire at one side of the apertured workpiece to a portion of the wire at the opposite side of the apertured workpiece.

An important object of the present invention is to provide a novel fastening device or strain relief grommet for application to an apertured workpiece and for retaining a wire or other elongated element, which grommet is constructed so as to grip the wire or element with a maximum force only when the grommet is substantially completely assembled with the apertured workpiece. In other words, it is an important object of the present invention to provide a novel strain relief grommet which is constructed so that any clamping pressure developed during application of the grommet to an apertured workpiece is not materially relieved upon final positioning of the grommet with respect to the apertured workpiece.

A more specific object of the present invention is to provide a novel strain relief grommet having the characteristics set forth in the preceding paragraph and including shoulder means adapted to be inserted through an apertured workpiece for engagement with a backside thereof in order to prevent withdrawal of the grommet from the workpiece aperture.

Still another object of the present invention is to provide a novel one-piece strain relief grommet of the above described type which is adapted to accommodate a plurality of wires or elements and which is also adapted to accommodate wires or elements of different sizes.

A further object of the present invention is to provide a novel strain relief grommet of the above described type which may be economically produced in one piece from resilient plastic material.

Other objects and advantages of the present invention will become apparent from the following description and the accompanying drawings wherein.

Figures 1, 2, 3, 4, 5, 6, 7, 8, 9, 10:
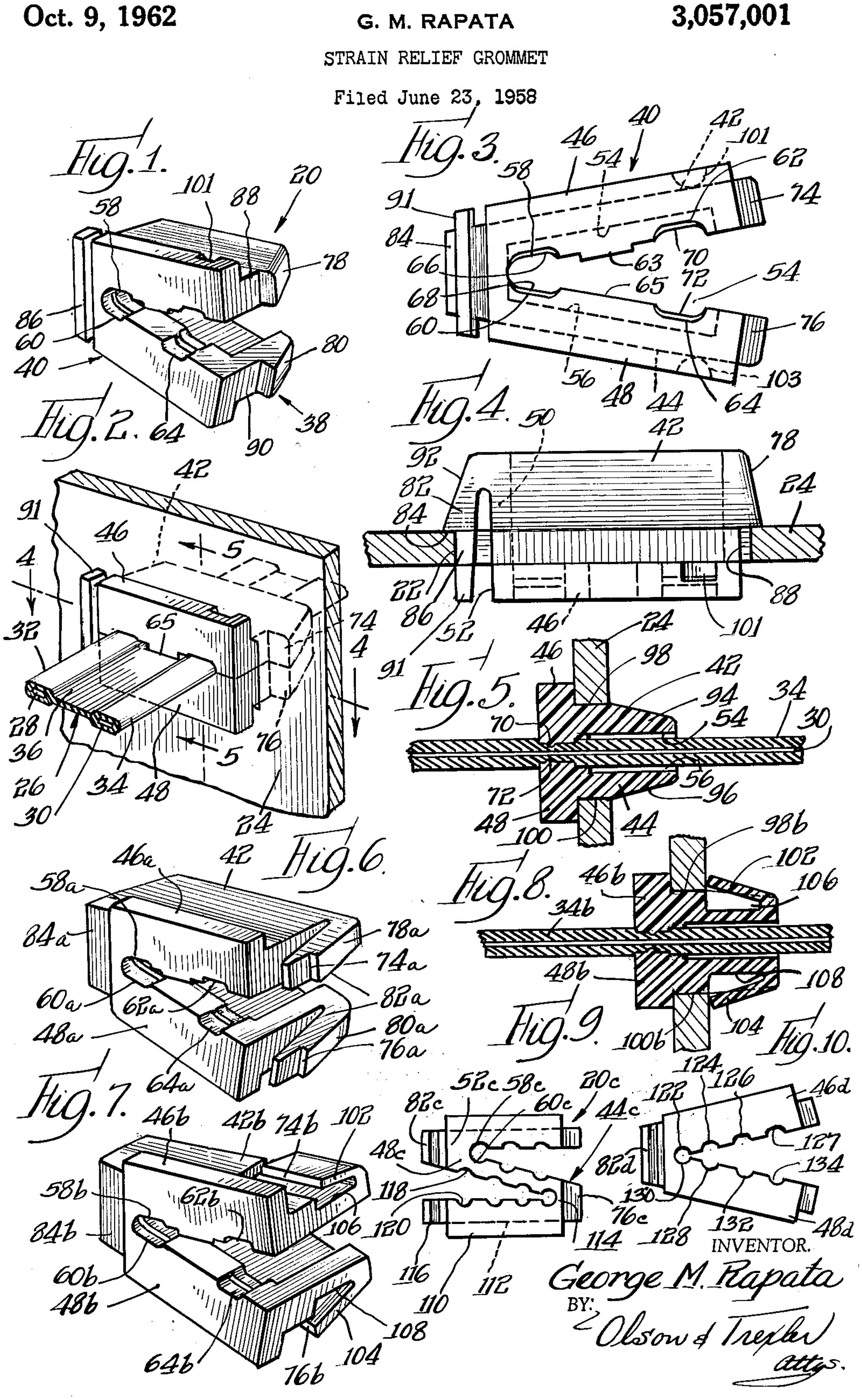
FIG. 1 is a perspective view showing a strain relief grommet incorporating features of the present invention.
FIG. 2 is a fragmentary perspective view showing a strain relief grommet of FIG. 1 fully assembled with an elongated element or wire and an apertured workpiece or panel.
FIG. 3 is an enlarged plan view of the strain relief grommet shown in FIG. 1.
FIG. 4 is an enlarged partial sectional view taken along line 4—4 in FIG. 2.
FIG. 5 is an enlarged fragmentary sectional view taken along line 5—5 in FIG. 2.
FIG. 6 is a perspective view showing a strain relief grommet incorporating a modified form of the present invention.
FIG. 7 is a perspective view showing a strain relief grommet incorporating another embodiment of the present invention.
FIG. 8 is a sectional view showing the device of FIG. 7 fully assembled with a wire and with an apertured workpiece.
FIG. 9 is a plan view showing another embodiment of the present invention.
FIG. 10 is a plan view showing another slightly modified form of the present invention.

Referring now more specifically to the drawings wherein like parts are designated by the same numerals throughout the various figures, a strain relief grommet 20 incorporating the features of the present invention is shown in FIGS. 1–5. The grommet 20 as well as the other embodiments which will be described in detail below is formed in one piece from a suitable tough and resilient plastic material such, for example, as nylon. As will be described more in detail below, the grommet 20 is adapted to be inserted into an aperture 22 provided in a workpiece or panel 24 for anchoring an elongated element or wire 26 extending through the workpiece. While the grommet may be adapted for accommodating wires of various sizes and shapes, the structure disclosed for the purpose of illustrating the present invention is especially suitable for use with a substantially flat twin lead including a pair of electricity conducting elements 28 and 30 surrounded by tubular portions 32 and 34 of insulating material which are integrally joined by a relatively thin central web 36.

The grommet 20 comprises a shank portion 38 insertable through the workpiece aperture 22 and a head portion 40 adapted to overlie and engage the outer surface of the workpiece 24 for limiting movement of the grommet through the workpiece. The shank portion 38 is provided by spaced opposed sections 42 and 44, and the head portion is also provided by a pair of spaced opposed sections 46 and 48. These opposed sections are integrally joined with each other by axially extending hinged sections 50 and 52. As shown in FIGS. 1 and 3, the opposed shank sections are normally disposed in diverging relationship and the opposed head sections are similarly disposed so as to provide a substantial gap 54 therebetween. This facilitates insertion of the wire 26 between the opposed sections of the head and shank portions. The resiliency of the material from which the grommet is formed permits flexing of the hinge sections so as to enable the opposed sections of the head and shank portions to be collapsed toward each other into substantially parallel abutting relationship for gripping the wire as will be discussed more fully below.

The opposed shank sections 42 and 44 are provided with axially extending recesses 54 and 56 in their inner sides surfaces so as to provide a passageway through which the wire may freely pass. The head sections 46 and 48 are provided with complementary recesses 58—60 and 62—64 in their inner margins for accommodating the enlarged portions 32 and 34 of the wire. It is to be noted that the recesses in the head sections are not as deep transversely of the grommet axis as the recesses in the shank portions so that the wire will be gripped between the opposing edges of the head section recesses when the grommet is fully applied to the wire and an apertured workpiece as shown in FIGS. 2 and 5. Also pressure pads 63 and 65 are provided for gripping the central web 36. The edges of the recesses and the pressure pad extend axially into the shank portion as shown best in FIG. 5 so as to be compressed directly between opposing edges of the workpiece for more secure engagement with the wire. In order even more securely to grip the wire, opposing ribs 66 and 68 project laterally inwardly toward each other from the opposing edges of the recesses 58 and 60, and substantially identical ribs 70 and 72 project toward each other from the opposing edges of the recesses 62 and 64. The manner in which these ribs are adapted to grip the wire is shown best in FIG. 5. It is seen that the opposing edges of the head section recesses and the ribs are adapted to compress or indent the insulating material of the wire 26 when the head sections are shifted together. It is further to be noted that after the wire insulation has been indented, any movement of the opposed head sections laterally away from each other will cause the opposing recess edges and ribs of the head sections to be at least partially retracted from maximum gripping engagement with the wire. Such reduction of the gripping engagement or partial release of the wire is prevented in accordance with the present invention in the manner described below.

In order to secure the grommet 20 with respect to the apertured panel 24, the shank portion of the grommet is provided with shoulder means adapted to be inserted through the workpiece aperture and adapted to engage a side of the workpiece opposite from the head portion of the grommet. More specifically, the shank sections 42 and 44 are respectively provided with shoulders 74 and 76 at ends thereof opposite from the hinge section 50. End surfaces 78 and 80 of the shank sections adjacent the shoulders 74 and 76 are tapered inwardly toward the entering end of the shank portion for facilitating insertion of the shank sections through the workpiece aperture. The laterally extending shoulder surfaces 74 and 76 are, of course, axially spaced from the head sections 46 and 48 sufficiently to enable the shoulder surfaces and the head sections to embrace opposite sides of the workpiece.

The shank portion of the grommet includes a flexible wing element 82 integrally joined to an entering end portion of the hinge section 50 and extending generally toward the trailing or head end of the grommet and in laterally spaced relationship with respect to the hinge section 50. The wing element 82 is provided with a laterally extending shoulder or surface 84 cooperable with the shoulders 74 and 76 for preventing withdrawal of the grommet from the workpiece aperture. The wing element is further provided with a finger portion 86 extending generally axially from the shoulder 84 and engageable with an edge of the workpiece aperture. The finger portion 86 is cooperable with oppositely disposed abutment surfaces 88 and 90 for locating the grommet properly within the workpiece aperture. A cross bar or auxiliary head portion 91 extends from the finger for overlying the workpiece. The portion 91 may be engaged by a tool, not shown, for collapsing the wing 82 for permitting removal of the grommet, if desired. The portion 91 also complements the head portion for improving the appearance of the device. An outer surface 92 of the wing element 82 is tapered in much the same manner as the surfaces 78 and 80 toward the entering end of the shank portion for further facilitating entry of the shank portion into the workpiece aperture.

As shown best in FIG. 5, opposite outer side surfaces of the shank sections 42 and 44 are provided with tapering entering end portions 94 and 96 which approach each other toward the free terminal end of the grommet shank portion. Portions 98 and 100 of the outer surfaces of the shank sections are engageable with opposite edges of the workpiece aperture when the grommet is fully applied to the workpiece. It is to be noted that the surface portions 98 and 100 are spaced apart at least as much as the greatest distance between the tapering or cam surface portions 94 and 96 for the purpose described below.

The grommet 20 is adapted to be assembled with the wire 26 and the apertured workpiece 24 in the following manner. The wire 26 is first inserted through the workpiece aperture and then the grommet is applied laterally to the wire until the recesses 58—60 and 62—64 in the grommet head sections are generally aligned with the enlarged portions 32 and 34 of the wire. Then the opposed head and shank sections are manually shifted toward each other sufficiently to permit the entering ends of the opposite side surface portions 94 and 96 to enter the opening in the workpiece 24. Recesses 101 and 103 are provided in the head sections for engagement by a tool, not shown, which may be used for transversely collapsing the grommet. After this has been accomplished, the shank portion of the grommet is forced through the workpiece aperture until the head sections engage the outer surface of the workpiece. During passage of the shank portion through the workpiece aperture, the wing element 82 is collapsed against the hinge section 50 by engagement of the cam surface 92 with the edge of the workpiece aperture, and the resiliency of the grommet material permits collapsing of the grommet shoulder means and then subsequent expansion of the shoulder means whereby the shoulder means may be snapped through the workpiece aperture for engagement with the backside of the workpiece as shown in FIG. 4. It is also to be noted that during passage of the shank portion through the workpiece aperture, the opposite side surface portions 94—96 and 98—100 progressively engage the opposite edges of the workpiece aperture so that the opposite head sections are progressively urged into more aggressive gripping engagement with the wire. In accordance with an important feature of the present invention, the structure is such that the collapsing and expanding action of the wing 82 and the shoulder means has no effect on the force with which the wire is gripped since this force is dependent upon the engagement of the opposite side surface portions 94—96 and 98—100 with the opposite edges of the workpiece aperture.

FIG. 6 shows a modified form of the present invention which is similar to the above described structure as indicated by the application of identical reference numerals with the suffix "*a*" added to corresponding elements. This embodiment differs only in that the shoulder **84*a* is of solid and relatively unyielding construction similar to the shoulders 74 and 76 of the above described embodiment while the shoulders 74*a* and 76*a* are provided on wing elements 82*a* essentially identical to the above described wing element except that they are located at the spaced free edges of the shank sections 42*a* and 44*a***.

FIGS. 7 and 8 show another modification of the present invention which is similar to the above described structures and indicated by the application of identical reference numerals with the suffix "*b*" added to corresponding elements. This embodiment differs from the structure shown in FIG. 6 primarily in that the shoulders **74*b* and 76*b* are on flexible wing elements 102 and 104 which are disposed at the outer sides rather than the free axially extending edges of the shank sections 42*b* and 44*b* respectively. In order to prevent the collapsing and expanding action of the wing elements 102 and 104 from adversely affecting the wire gripping action of the grommet, recesses 106 and 108 are provided in the outer sides of the shank sections 42*b* and 44*b* respectively for accommodating the wing elements 102 and 104 during insertion of the wing elements through the workpiece aperture. It is to be noted that the recesses 106 and 108 have a depth transversely of the grommet shank sections and the surfaces 98b and 100b which is at least substantially equal to the thickness of the wing elements 102 and 104. Thus, collapsing of the wing elements 102 and 104 during insertion of the grommet shank portion into a workpiece aperture will not result in the application of clamping forces to the wire greater than clamping forces resulting from engagement of the surface portions 98b and 100b** with the opposite edges of the workpiece aperture.

In FIG. 9 there is shown another embodiment of the present invention which is especially suitable for anchoring a plurality of wires extending through a workpiece aperture. More specifically, the grommet 20c of this embodiment is provided with additional head and shank sections 110 and 112 diverging with respect to the head and shank sections 48c and 44c from an axially extending resilient hinge section 114 which integrally joins these last mentioned head and shank sections. A resilient wing element 116 similar to the wing element 82c provides a workpiece engageable shoulder at the free axially extending edge of the shank section 112. A plurality of complementary wire accommodating recesses 118 and 120 are provided in opposing edges of the head sections 48c and 110. Thus, the grommet 20c is adapted to grip one or more wires between the head sections 48c and 110 as well as between the head sections 46c and 48c.

FIG. 10 shows a further embodiment of the present invention which is substantially identical to the embodiment shown in FIGS. 1–5 except that it is adapted to accommodate selectively wires or twin leads of different sizes. More specifically, recesses 122, 124, 126 and 127 having ribs projecting therein are formed along the inner margin of the head section 46d and complementary recesses 128, 130, 132 and 134 having rib means projecting therein are provided in the head section 48d. The recesses 122 through 134 are formed and provided with inwardly projecting ribs in substantially the same manner as the recesses 58 through 64 described above. It will be appreciated that, for example, a twin lead of one size may be gripped within the recesses 122—130 and 127—134 or, if desired, a twin lead of another size could be gripped within the recesses 122—130 and 126—132. Other combinations of the recesses may be used for receiving wires or twin leads of other sizes.

While the preferred embodiments of the present invention have been shown and described herein, it is obvious that many structural details may be changed without departing from the spirit and scope of the appended claims.

The invention is claimed as follows:

1. A one piece resilient plastic strain relief grommet comprising first and second oppositely disposed laterally spaced apart members including means for accommodating and gripping an elongated element therebetween when said members are moved together, a resilient section integrally connecting said members for movement to and from spaced apart and element gripping positions, said members including shank sections insertable into an apertured workpiece and head means engageable with one side of the workpiece, said shank sections including oppositely facing outer side surfaces in the vicinity of said head means and engageable with opposite edges of the workpiece aperture for urging said members with a predetermined force into gripping engagement with said element when said shank sections are fully inserted into the workpiece aperture, and at least one of said shank sections having shoulder means resiliently connected thereto for collapsing movement from a predetermined outward position toward the adjacent shank section permitting the shoulder means to be snapped through the workpiece aperture and facing generally toward said head means in spaced relationship for engaging the side of the workpiece opposite from the head means when the shank sections are fully inserted into the workpiece aperture and the shoulder means resiliently returned to the said predetermined outward position, the collapsing movement of said shoulder means being independent of gripping movement of said members on the gripped element during passage through the workpiece aperture to prevent said members from gripping the inserted element with a force substantially greater than the predetermined force at any time during assembly of the grommet with the apertured workpiece, said oppositely facing side surfaces extending generally axially from said head means sufficiently for at least partial engagement with said opposite edges of the workpiece aperture substantially upon engagement of said shoulder means with said last mentioned side of the workpiece during application of the grommet to the workpiece.

2. A one piece resilient plastic strain relief grommet as claimed in claim 1, wherein the shoulder means is connected to the shank section for colllapsing movement in a direction transversely of the direction of gripping movement of said members during application of the grommet to the apertured workpiece.

3. A one piece resilient plastic strain relief grommet as claimed in claim 1, wherein the shoulder means is connected to the shank section for collapsing movement in the direction of gripping movement of said members but independently thereof during application of the grommet to the apertured workpiece.

4. A one piece resilient plastic strain relief grommet as claimed in claim 1, wherein the shoulder means includes a wing integrally connected to an entering end of at least one of said shank sections and extending in laterally spaced relationship with respect thereto and generally toward said head means.

5. A one piece resilient plastic strain relief grommet as claimed in claim 4, wherein said wing is movable in a direction transversely of the direction of gripping movement of said members.

6. A one piece resilient plastic strain relief grommet as claimed in claim 1, wherein the shoulder means includes a wing integrally connected to an entering end of at least one of said shank sections and extending in laterally spaced relationship with respect thereto and generally toward the head means with the wing being collapsible in the direction of gripping movement of said members but independently thereof during application of the grommet to the apertured workpiece.

References Cited in the file of this patent

UNITED STATES PATENTS

| | | |
|---|---|---|
| 2,424,757 | Klumpp | July 29, 1947 |
| 2,563,604 | Hultgren | Aug. 7, 1951 |
| 2,836,215 | Rapata | May 27, 1958 |
| 2,895,003 | Rapata | July 14, 1959 |
| 2,952,730 | Simonds | Sept. 30, 1960 |

FOREIGN PATENTS

| | | |
|---|---|---|
| 845,603 | France | Aug. 29, 1939 |